R. A. JOHNSON.
Manufacture of Moldings and other Articles from Celluloid or Pyroxyline.

No. 217,111. Patented July 1, 1879.

Witnesses:
Chas. C. Gill
Wm. Rd. Smith

Inventor:
Rob't. A. Johnson
By his Attys,
Cox & Cox

UNITED STATES PATENT OFFICE.

ROBERT A. JOHNSON, OF NEW YORK, N. Y.

IMPROVEMENT IN THE MANUFACTURE OF MOLDINGS AND OTHER ARTICLES FROM CELLULOID OR PYROXYLINE.

Specification forming part of Letters Patent No. 217,111, dated July 1, 1879; application filed May 31, 1879.

*To all whom it may concern:*

Be it known that I, ROBERT A. JOHNSON, of New York, in the county of New York and State of New York, have invented a new and useful Improvement in the Manufacture of Moldings and other Articles from Celluloid or Pyroxyline, of which the following is a specification, reference being had to the accompanying drawings.

The invention relates to the production of moldings for show-cases, show-windows, and similar purposes.

It consists, essentially, in a molding formed preferably by drawing a sheet of celluloid or other analogous plastic material having a metallic or pliable back in the manner in which certain metals have been drawn so as to form the exterior surface of the molding.

The moldings heretofore chiefly used in the construction of show-cases and similar articles have, as above stated, been coated with a thin sheet of metal, usually brass, white metal, or German silver, which have been drawn to conform to the contour of the surface of the molding, in a manner well understood by persons having a knowledge of the art. The objection to such moldings, however, is that they are very easily soiled, particularly when handled, which necessitates their being constantly polished or cleaned, it being essential that they be kept in an attractive condition. This objection is overcome by my invention, whereby I am enabled to produce a molding having, perhaps, none of the disadvantages referred to, while it possesses qualities which I believe no other molding has. It is sufficiently durable, may be made in any form, and is rather benefited than injured or soiled by the kind of use to which it is likely to be subjected.

For octagonal and other strictly angular moldings, I employ, by preference, a simple sheet of celluloid or other analogous plastic material, and for those known as "ogee," "ovolo," and others in which curved lines occur I supplement the plastic sheet with a back of brass, lead, or other pliable material or metal, to which the plastic sheet is secured by any suitable paste, as may be desired. In both cases the sheet is drawn to cover the molding, to all intents and purposes, the same as metallic sheets are now drawn; but the simple sheet of celluloid or other plastic material cannot be as successfully employed where it is necessary to adapt the coating to curved surfaces.

Figure 1:
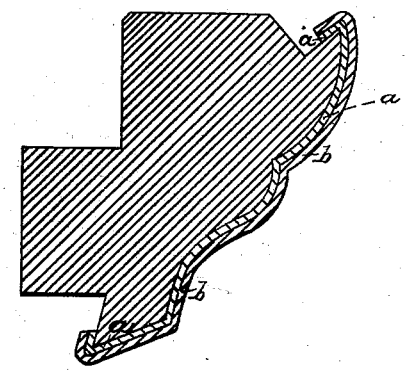
Figure 2:
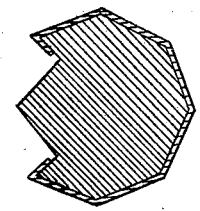

In the accompanying drawings, Figure 1 shows a coated molding having an ogee curve, and Fig. 2 a hexagonal-shaped molding.

In Fig. 1 an application of the sheet consisting of the celluloid or other plastic material provided with the metallic or pliable back is shown, *a* denoting the back, and *b* the face, of the sheet, the same being drawn to conform to the molding, as hereinbefore recited. The fabrication of this sheet may be successfully effected by preparing the two sheets in any convenient manner and applying any suitable adhesive substance upon the surface of one of the sheets, and then rolling or otherwise pressing the two together. By preference I apply a solution of collodion or alcohol upon the surface of the sheet of celluloid and roll or otherwise fasten it to the other sheet. But other means of uniting the sheets will suggest themselves to persons familiar with the art, the only object being to fasten the two securely together, so as to form a sheet that may be readily drawn without separating its parts. I contemplate the use of this sheet chiefly in the construction of moldings in which curved lines occur, to which it is especially adapted; but it may be used for moldings of every kind, if preferred.

Fig. 2 shows an application of a simple sheet of celluloid or other analogous plastic material applied to an angular molding. The sheet of celluloid or analogous material is wrapped or drawn over the outer surface of the molding, substantially as if it were a sheet of metal, its ends being lapped to bite the edges thereof in the customary manner.

I have heretofore used celluloid, and recommend it as the best material of which I know; but other materials having substantially the same properties may be employed with fair results.

The material may be colored during the process of manufacture, and after it has been applied polished in any convenient manner.

It is practicable, under certain conditions, to form the coating by applying a solution of celluloid or other analogous material by means of a brush and otherwise. While, therefore, I contemplate the application of the celluloid or other analogous plastic material only in the manner set forth, I do not limit my claims to any specific method of application; but

What I claim as new, and desire to secure by Letters Patent, is—

1. A molding for show-cases and other articles having an exterior surface of celluloid or analogous plastic material, substantially as set forth.

2. A molding for show-cases and other articles the exterior surface of which is formed of a sheet or coating of celluloid or other analogous plastic material, substantially as set forth.

3. A molding for show-cases and other articles covered with a sheet or coating of celluloid or other analogous plastic material having a metallic or pliable back, substantially as set forth.

In testimony that I claim the foregoing improvement in manufacture of celluloid or pyroxyline, as above described, I have hereunto set my hand this 28th day of May, 1879.

ROBERT A. JOHNSON.

Witnesses:
HOWLAND FOX,
CHAS. C. GILL.